(12) United States Patent
An et al.

(10) Patent No.: US 12,537,138 B2
(45) Date of Patent: Jan. 27, 2026

(54) MULTILAYER ELECTRONIC COMPONENT (71) Applicant: SAMSUNG ELECTRO-MECHANICS CO., LTD., Suwon-si (KR)

(72) Inventors: So Jung An, Suwon-si (KR); Hyung Jong Choi, Suwon-si (KR); Jung Won Park, Suwon-si (KR); Yoo Jeong Lee, Suwon-si (KR); Kwang Yeun Won, Suwon-si (KR); Woo Kyung Sung, Suwon-si (KR); Byung Jun Jeon, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 256 days.

(21) Appl. No.: 18/540,134

(22) Filed: Dec. 14, 2023

(65) Prior Publication Data
US 2024/0222032 A1 Jul. 4, 2024

(30) Foreign Application Priority Data

Dec. 29, 2022 (KR) .................. 10-2022-0188989

(51) Int. Cl.
*H01G 4/30* (2006.01)
*H01G 2/12* (2006.01)
*H01G 4/008* (2006.01)
*H01G 4/012* (2006.01)
(Continued)

(52) U.S. Cl.
CPC ............... *H01G 4/30* (2013.01); *H01G 2/12* (2013.01); *H01G 4/008* (2013.01); *H01G 4/012* (2013.01); *H01G 4/12* (2013.01); *H01G 4/224* (2013.01)

(58) Field of Classification Search
CPC .......... H01G 4/30; H01G 4/008; H01G 4/012; H01G 4/12; H01G 4/224; H01G 2/12
See application file for complete search history.

(56) References Cited

U.S. PATENT DOCUMENTS 10,395,840 B1 * 8/2019 Park .................... H01G 2/065
10,720,279 B2 7/2020 Kim et al.
10,825,611 B1 11/2020 Fukuoka et al.
(Continued)

FOREIGN PATENT DOCUMENTS

CN 114446656 A 5/2022
JP 2021-19008 A 2/2021
KR 10-2021-0119304 A 10/2021

OTHER PUBLICATIONS

Extended European Search Report dated May 19, 2025, issued in corresponding European Patent Application No. 23217484.7.

*Primary Examiner* — Michael P McFadden
(74) *Attorney, Agent, or Firm* — Morgan Lewis & Bockius LLP (57) ABSTRACT

A multilayer electronic component may include: a body including a dielectric layer and internal electrodes; and external electrodes including an electrode layer disposed on the body and a plating layer disposed on the electrode layer, wherein the plating layer includes an extension extending onto the body to contact the body, and the extension includes one or more grains in which an angle between a surface of the body in contact with the extension and a major axis of the grain is 70 degrees or greater and 110 degrees or less.

25 Claims, 8 Drawing Sheets

(51) Int. Cl.
  *H01G 4/12*    (2006.01)
  *H01G 4/224*   (2006.01)

(56) References Cited

U.S. PATENT DOCUMENTS

| | | |
|---|---|---|
| 11,380,488 B2 | 7/2022 | Kim et al. |
| 2012/0188682 A1* | 7/2012 | Sato ................ H01G 4/232 |
| | | 336/200 |
| 2015/0022943 A1* | 1/2015 | Chae ................ H01G 4/232 |
| | | 361/301.4 |
| 2018/0082785 A1* | 3/2018 | Asano ............... H01G 4/232 |
| 2020/0082985 A1* | 3/2020 | Suga ................ H01G 4/2325 |
| 2021/0020370 A1 | 1/2021 | Yoshino et al. |
| 2021/0304967 A1* | 9/2021 | Hoshino ............. H01G 4/232 |
| 2021/0358692 A1 | 11/2021 | Shin et al. |
| 2022/0139618 A1 | 5/2022 | Kang et al. |
| 2022/0262570 A1 | 8/2022 | Hoshino et al. |
| 2023/0368976 A1* | 11/2023 | Fukuda ............. H01G 4/2325 |

\* cited by examiner

-- Related Art --

FIG. 8

-- Related Art --

MULTILAYER ELECTRONIC COMPONENT

CROSS-REFERENCE TO RELATED APPLICATION

This application claims benefit of priority to Korean Patent Application No. 10-2022-0188989 filed on Dec. 29, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), which is a multilayer electronic component, is a chip-type capacitor mounted on the printed circuit boards of various types of electronic products such as imaging devices including liquid grain displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease of mounting. Recently, as various electronic devices such as computers and mobile devices have been reduced in size and increased in power, demand for miniaturization and high capacitance of multilayer ceramic capacitors have been increased. In addition, high reliability is required as the use environment of the multilayer ceramic capacitors has been diversified.

Insulation resistance of multilayer ceramic capacitors may deteriorate under the humid environment. In particular, when an interface between a body and a plating layer is opened at the end of a band portion of an external electrode, a penetration path of moisture and hydrogen may occur, which may reduce moisture resistance reliability.

Therefore, there is a need for a method of suppressing a phenomenon in which the interface between the body and the plating layer is opened at the end of the band portion of the external electrode to form a penetration path of moisture or the like.

SUMMARY

An aspect of the present disclosure may provide a multilayer electronic component having improved reliability.

An aspect of the present disclosure may also provide a multilayer electronic component in which a phenomenon that an interface between a body and a plating layer is opened at the end of a band portion of an external electrode to form a penetration path of moisture or the like is suppressed.

According to an aspect of the present disclosure, a multilayer electronic component may include: a body including a dielectric layer and internal electrodes; and external electrodes including an electrode layer disposed on the body and a plating layer disposed on the electrode layer, wherein the plating layer includes an extension extending onto the body to contact the body, and the extension includes one or more grains in which an angle between a surface of the body in contact with the extension and a major axis of the one or more grains is 70 degrees or greater and 110 degrees or less.

According to another aspect of the present disclosure, a multilayer electronic component may include: a body including a dielectric layer and internal electrodes; and external electrodes including an electrode layer disposed on the body and a plating layer disposed on the electrode layer, wherein the plating layer includes an extension extending onto the body to contact the body, and the extension includes a grain having a growth direction that is substantially perpendicular to a surface of the body in contact with the extension.

According to another aspect of the present disclosure, a multilayer electronic component may include: a body including a dielectric layer and internal electrodes; and external electrodes including an electrode layer disposed on the body and a plating layer disposed on the electrode layer, wherein the plating layer includes an extension extending onto the body to contact the body, and the extension includes one or more grains in which an angle between a surface of the body in contact with the extension and a major axis of the one or more grains is 80 degrees or greater and 100 degrees or less.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawing, a first direction may be defined as a thickness (T) direction, a second direction may be defined as a length (L) direction, and a third direction may be defined as a width (W) direction.

Figure 1:
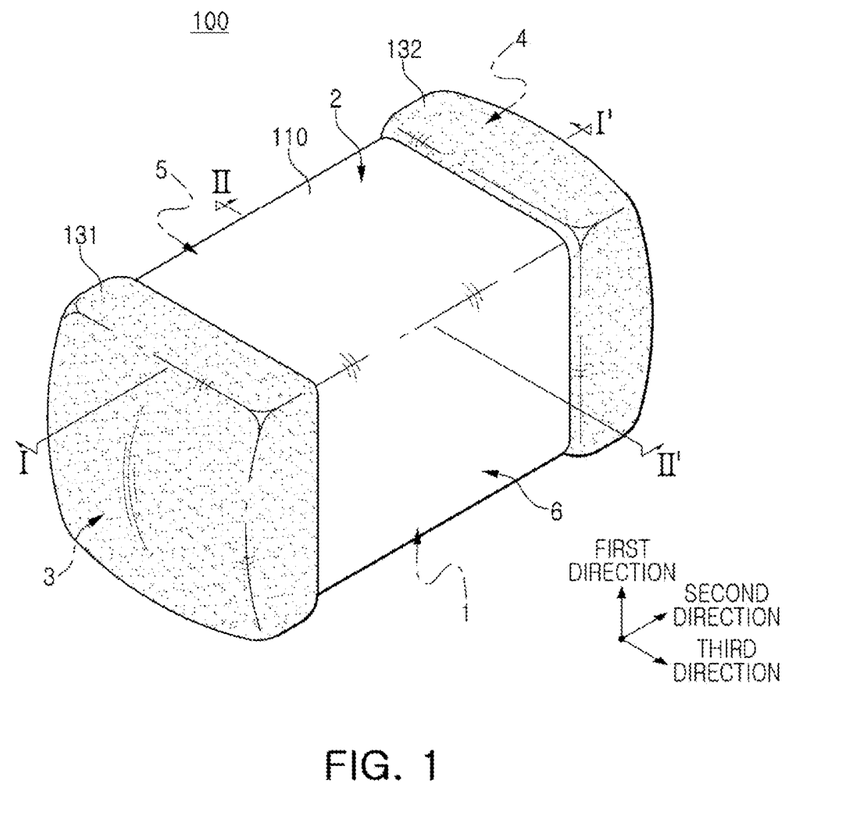
FIG. 1 is a perspective view illustrating a multilayer electronic component according to an exemplary embodiment in the present disclosure.
Figure 2:
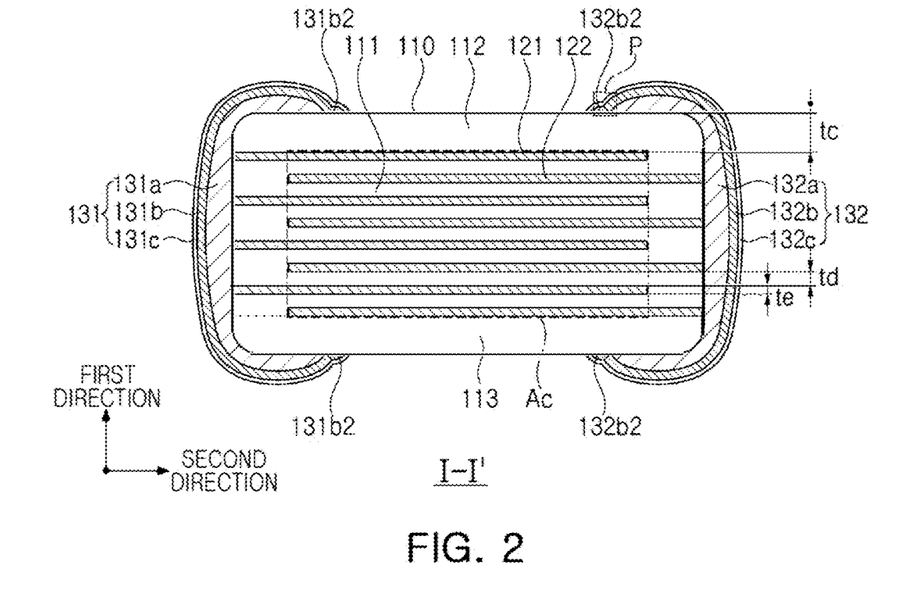
FIG. 2 is a cross-sectional view taken along line I-I' in FIG. 1.

FIG. 1 is a perspective view illustrating a multilayer electronic component according to an exemplary embodiment in the present disclosure;

FIG. 2 is a cross-sectional view taken along line I-I' of FIG. 1.

Figure 3:
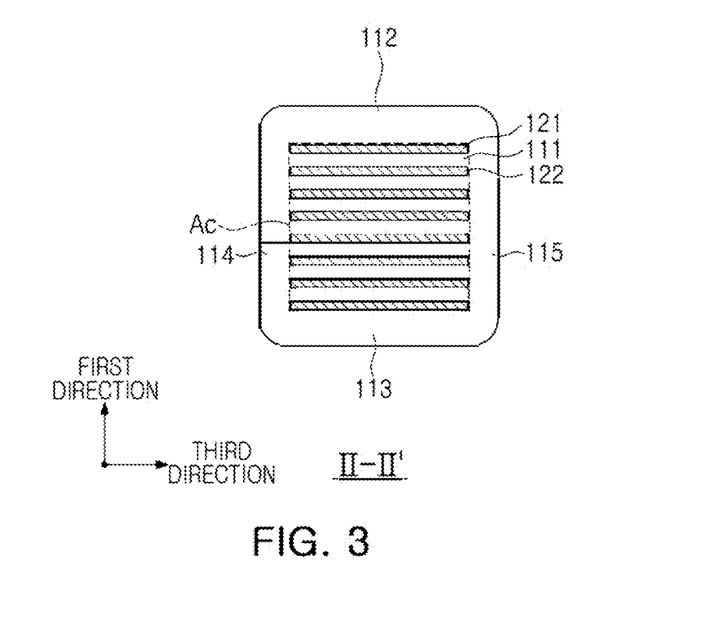
FIG. 3 is a cross-sectional view taken along line II-II' in FIG. 1.

FIG. 3 is a cross-sectional view taken along line II-II' of FIG. 1.

Figure 4:
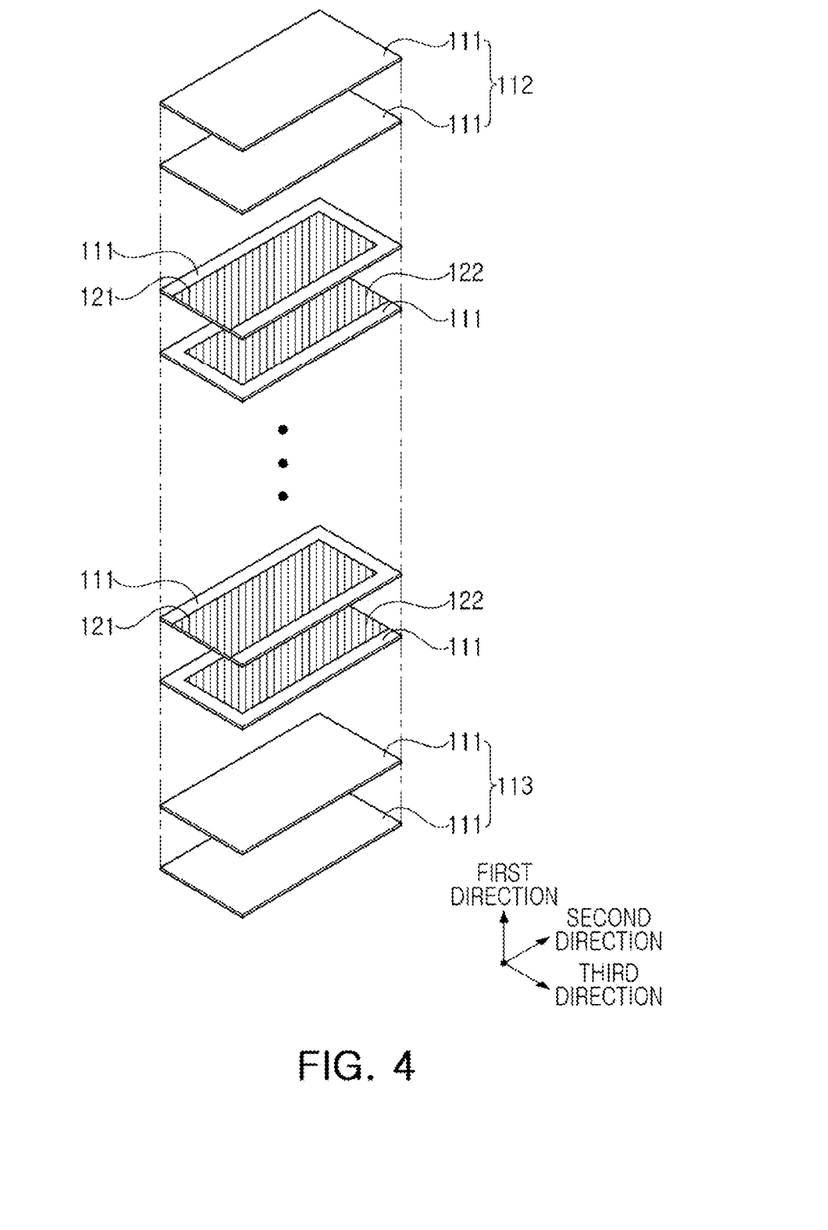
FIG. 4 is an exploded perspective view of a disassembled body of a multilayer electronic component according to an exemplary embodiment in the present disclosure.

FIG. 4 is an exploded perspective view of a disassembled body of a multilayer electronic component according to an exemplary embodiment in the present disclosure.

Figure 5:
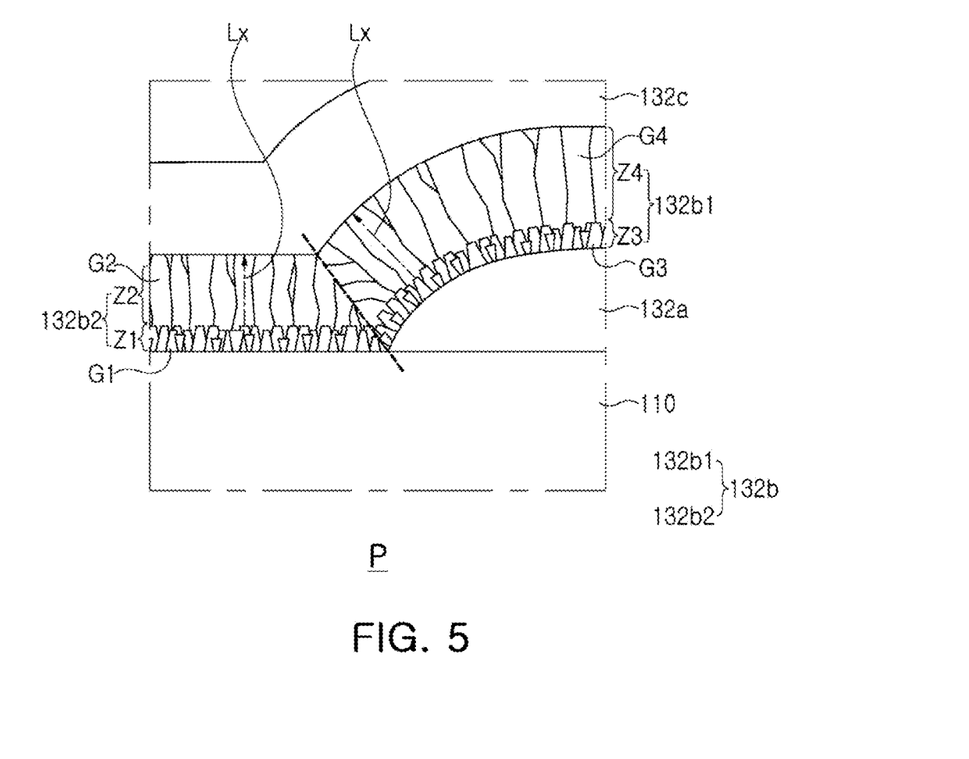
FIG. 5 is an enlarged view of region P in FIG. 2.

FIG. 5 is an enlarged view of region P of FIG. 2.

Hereinafter, a multilayer electronic component 100 according to an exemplary embodiment in the present disclosure will be described with reference to FIGS. 1 through 5.

A multilayer electronic component 100 according to an exemplary embodiment in the present disclosure may include a body 110 including a dielectric layer 111 and internal electrodes 121 and 122; and external electrodes 131 and 132 including electrode layers 131a and 132a disposed on the body and plating layers 131b and 132b disposed on the electrode layers, wherein the plating layers 131b and 132b include extensions 131b2 and 132b2 extending onto the body to contact the body, and the extensions include one or more grains in which an angle between a surface of the body in contact with the extension and a major axis Lx of the grain is 70 degrees or greater and 110 degrees or less.

In the case of a general plating layer of the related art, an interface between a body and a plating layer is opened at the end of a band portion of an external electrode so that a penetration path of moisture or the like may be easily formed. This is because the plating layer is generally formed of metal and has a low bonding force with the body.

In addition, as a result of research conducted by the present inventors, it was found that the general plating layer of the related art includes grains grown upon receiving charges from an electrode layer, so that a growth direction of grains of the plating layer at the end of the band portion was a horizontal direction, and thus, a bonding force with the body was low.

When a grain in which an angle between a surface BS of the body in contact with the extension and the major axis Lx of the grain is 70 degrees or greater and 110 degrees or less is included in the extensions 131b2 and 132b2 of the plating layer according to an exemplary embodiment in the present disclosure, the bonding force between the body 110 and the plating layer 131b and 132b may be improved, and accordingly, the moisture resistance reliability of the multilayer electronic component may be improved.

Hereinafter, each component included in the multilayer electronic component 100 according to an exemplary embodiment in the present disclosure will be described.

In the body 110, the dielectric layers 111 and the internal electrodes 121 and 122 are alternately stacked.

Although the specific shape of the body 110 is not particularly limited, the body 110 may have a hexahedral shape or a shape similar thereto as illustrated. Due to the shrinkage of ceramic powder included in the body 110 during a sintering process, the body 110 may not have a perfectly straight hexahedral shape but may have a substantially hexahedral shape.

The body 110 may have first and second surfaces 1 and 2 facing each other in the first direction, third and fourth surfaces connected to the first and second surfaces 1 and 2 and facing each other in the second direction, and fifth and sixth surfaces 5 and 6 connected to the first and second surfaces 1 and 2 and connected to the third and fourth surfaces 3 and 4 and facing each other in the third direction.

In an exemplary embodiment, the body 110 may include a 1-3 corner connecting the first surface and the third surface, a 1-4 corner connecting the first surface and the fourth surface, a 2-3 corner connecting the second surface and the third surface, and a 2-4 corner connecting the second surface and the fourth surface, and the 1-3 corner and the 2-3 corner are contracted to the center of the body in the first direction toward the third surface, and the 1-4 corner and the 2-4 corner are contracted to the center of the body in the first direction toward the fourth surface.

As a margin region in which the internal electrodes 121 and 122 are not disposed on the dielectric layer 111 overlaps, a step difference occurs due to a thickness of the internal electrodes 121 and 122 so that the corner connecting the first surface to the third to fifth surfaces and/or the corner connecting the second surface to the third to fifth surfaces may be contracted toward the center of the body 110 in the first direction with respect to the first surface or the second surface. Alternatively, the corner connecting the first surface 1 to the third to sixth surfaces 3, 4, 5, and 6 and/or the corner connecting the second surface 2 to the third to sixth surfaces 3, 4, 5, and 6 may be contracted toward the center of the body 110 in the first direction with respect to the first or second surface. Alternatively, as the corners connecting each surface of the body 110 are subject to a separate process to prevent chipping defects, the corner connecting the first surface to the third to sixth surfaces and/or the corner connecting the second surface to the third to sixth surfaces may have a round shape.

The corners may include a 1-3 corner connecting the first surface and the third surface, a 1-4 corner connecting the first surface and the fourth surface, a 2-3 corner connecting the second surface and the third surface, and a 2-4 corner connecting the second surface and the fourth surface. In addition, the corners may include a 1-5 corner connecting the first surface and the fifth surface, a 1-6 corner connecting the first surface and the sixth surface, a 2-5 corner connecting the second surface and the fifth surface, and a 2-6 corner connecting the second surface and the sixth surface. The first to sixth surfaces of the body 110 may be generally flat surfaces, and non-flat regions may be regarded as corners. Hereinafter, an extension line of each surface may refer to a line extending based on a flat portion of each surface.

At this time, a region of the external electrode 131 and 132 disposed at the corner of the body 110 may be referred to as a corner portion, a region of the external electrode 131 and 132 disposed on the third and fourth surfaces of the body 110 may be referred to as a connection portion, and a region of the external electrode 131 and 132 disposed on the first and second surfaces of the body 110 may be referred to as a band portion.

Meanwhile, in order to suppress the step difference caused by the internal electrodes 121 and 122, when the margin portions 114 and 115 are formed by cutting the body so that the internal electrodes are exposed to the fifth and sixth surfaces 5 and 6 after stacking, and then stacking a single dielectric layer or two or more dielectric layers on both side surfaces of the capacitance forming portion Ac, the portion in which the first surface is connected to the fifth and sixth surfaces and the portion in which the second surface is connected to the fifth and sixth surfaces may not be contracted.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient capacitance may be obtained. For example, a barium titanate-based material, a lead composite perovskite-based material, or a strontium titanate-based material may be used. The barium titanate-based material may include $BaTiO_3$-based ceramic powder, and examples of the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) in which Ca, Zr, etc. is partially dissolved in $BaTiO_3$.

In addition, as a material for forming the dielectric layer 111, various ceramic additives, organic solvents, binders, dispersants, etc. may be added to powder of barium titanate ($BaTiO_3$) according to purposes of the present disclosure.

Meanwhile, an average thickness td of the dielectric layer 111 may not be particularly limited. For example, the average thickness td of the dielectric layer 111 may be 0.2 µm or greater and 2 µm or less. However, in general, if the dielectric layer is thinly formed to have a thickness less than 0.6 µm, in particularly, if the thickness of the dielectric layer is 0.35 µm or less, the reliability of the multilayer electronic component 100 may be further reduced.

According to an exemplary embodiment in the present disclosure, by controlling the grains of the extensions 131b2 and 132b2 of the plating layers, the reliability of the multilayer electronic component 100 may be secured even when the average thickness td of the dielectric layer 111 is 0.35 µm or less. That is, when the average thickness td of the dielectric layer 111 is 0.35 µm or less, the reliability improvement effect according to the present disclosure may be more remarkable.

The average thickness td of the dielectric layer 111 may refer to the average thickness td of the dielectric layer 111 disposed between the first and second internal electrodes 121 and 122.

The average thickness td of the dielectric layer 111 may be measured by scanning an image of a cross-section of the body 110 in the length and thickness directions (L-T) with a scanning electron microscope (SEM) with magnification of 10,000. More specifically, thicknesses at 30 equally spaced points of one dielectric layer in the length direction in the scanned image may be measured and an average value thereof may be measured. The 30 equally spaced points may be designated in the capacitance forming portion Ac. In addition, when an average value is measured by extending the average value measurement to 10 dielectric layers, the average thickness of the dielectric layer may be further generalized. Other methods and/or tools appreciated by one of ordinary skill in the art, even if not described in the present disclosure, may also be used.

The body 110 may include a capacitance forming portion Ac forming capacitance by including the first internal electrodes 121 and the second internal electrodes 122 disposed to face each other with the dielectric layer 111 interposed therebetween and cover portions 112 and 113 formed above and below the capacitance forming portion Ac in the first direction.

In addition, the capacitance forming portion Ac, which contributes to forming the capacitance of the capacitor, may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac in the thickness direction, respectively, and may basically serve to prevent damage to the internal electrode due to are physical or chemical stress.

The upper cover portion 112 and the lower cover portion 113 may not include internal electrodes and may include the same material as the dielectric layer 111.

That is, the upper cover portion 112 and the lower cover portion 113 may include a ceramic material, for example, a barium titanate ($BaTiO_3$)-based ceramic material.

In addition, margin portions 114 and 115 may be disposed on side surfaces of the capacitance forming portion Ac.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the body 110 in the width direction.

As shown in FIG. 3, the margin portions 114 and 115 may refer to regions between both ends of the first and second internal electrodes 121 and 122 in a cross-section of the body 110 cut in the width-thickness (W-T) direction and a boundary surface of the body 110.

The margin portions 114 and 115 may basically serve to prevent damage to the internal electrode due to physical or chemical stress.

The margin portions 114 and 115 may be formed by forming internal electrodes by applying a conductive paste on the ceramic green sheet except a portion in which the margin portion is to be formed.

In addition, in order to suppress a step difference caused by the internal electrodes 121 and 122, after stacking, the internal electrodes may be cut to be exposed to the fifth and sixth surfaces 5 and 6 of the body, and then a single dielectric layer or two or more dielectric layers may be stacked on both side surfaces of the capacitance forming portion Ac in the third direction (the width direction) to form the margin portions 114 and 115.

The internal electrodes 121 and 122 may alternately be disposed with the dielectric layer 111.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4. The first electrode layer 131 may be disposed on the third surface 3 of the body and connected to the first internal electrode 121, and the second electrode layer 132 may be disposed on the fourth surface 4 of the body and connected to the second internal electrode 122.

That is, the first internal electrode 121 may not be connected to the second electrode layer 132 but be connected to the first electrode layer 131, and the second internal electrode 122 may not be connected to the first electrode layer 131 but be connected to the second electrode layer 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking ceramic green sheets on which the first internal electrodes 121 are printed and ceramic green sheets on which the second internal electrodes 122 are printed, and then firing the ceramic green sheets.

Materials forming the internal electrodes 121 and 122 are not particularly limited, and materials having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but the present disclosure is not limited thereto.

Also, the average thickness te of the internal electrodes 121 and 122 may not be particularly limited. For example, the average thickness te of the internal electrodes 121 and 122 may be 0.2 µm or greater and 2 µm or less.

However, in general, when the internal electrode is formed to be as thin to be less than 0.6 µm, in particularly, when the thickness of the internal electrode is less than 0.35 µm, the reliability of the multilayer electronic component 100 may be more problematic.

According to an exemplary embodiment in the present disclosure, by controlling the grains of the extensions 131b2 and 132b2 of the plating layers, the reliability may be improved even when the average thickness te of the internal electrodes 121 and 122 is 0.35 µm or less.

Therefore, when the thickness of the internal electrodes 121 and 122 is 0.35 µm or less, the effect according to the present disclosure may be more remarkable, and miniaturization and high capacitance of the multilayer electronic component may be more easily achieved.

Here, the average thickness te of the internal electrodes 121 and 122 may refer to an average thickness te of one internal electrode.

The average thickness te of the internal electrodes 121 and 122 may be measured by scanning an image of a cross-section body 110 in the length and thickness directions (L-T) with a scanning electron microscope (SEM) with magnification of 10,000. More specifically, an average value may be measured by measuring the thicknesses of one internal electrode at 30 equally spaced points in the length direction in the scanned image. The 30 equally spaced points may be designated in the capacitance forming portion Ac. In addition, when the average value is measured by extending the average value measurement to ten internal electrodes, the average thickness of the internal electrodes may be further generalized. Other methods and/or tools appreciated by one of ordinary skill in the art, even if not described in the present disclosure, may also be used.

The external electrodes 131 and 132 may be disposed on the third and fourth surfaces 3 and 4 of the body 110. The external electrodes 131 and 132 may include the first and second external electrodes 131 and 132 disposed on the third and fourth surfaces 3 and 4 of the body 110 and connected to the first and second internal electrodes 121 and 122, respectively. At this time, a region of the external electrode 131 and 132 disposed at the corner of the body 110 may be referred to as a corner portion, a region of the external electrode 131 and 132 disposed on the third and fourth surfaces of the body 110 may be referred to as a connection portion, and a region of the external electrode 131 and 132 disposed on the first and second surfaces of the body may be referred to as a band portion.

In the present exemplary embodiment, although the structure in which the multilayer electronic component 100 has two external electrodes 131 and 132 is described, the number and shape of the external electrodes 131 and 132 may be changed according to the shape of the internal electrodes 121 and 122 or other purposes.

The external electrodes 131 and 132 may include the plating layers 131a and 132a and the plating layers 131b and 132b disposed on the electrode layer.

The electrode layers 131a and 132a may be formed using any material as long as the material has electrical conductivity, such as metal, and a specific material may be determined in consideration of electrical properties and structural stability.

In an exemplary embodiment, the electrode layers 131a and 132a may be fired electrodes including conductive metal and glass.

In an exemplary embodiment, the electrode layers 131a and 132a may be a resin electrode including conductive metal and a resin.

In an exemplary embodiment, the electrode layers 131a and 132a may include more than 95 at % of metal elements. That is, the electrode layers 131a and 132a may be substantially formed of metal.

In addition, the electrode layers 131a and 132a may have a form in which a fired electrode and a resin electrode are sequentially formed on the body. In addition, the electrode layers 131a and 132a may be formed by transferring a sheet including conductive metal on the body or by transferring a sheet including conductive metal on the fired electrode.

A material of the conductive metal used in the electrode layers 131a and 132a is not particularly limited as long as the material may be electrically connected to the internal electrode for the formation of capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof.

The plating layers 131b and 132b may include the extensions 131b2 and 132b2 extending onto the body 110 and contacting the body, and the extensions 131b2 and 132b2 may include one or more grains in which an angle between the surface BS of the body in contact with the extension and a major axis Lx of the grain is 70 degrees or greater and 110 degrees or less.

The plating layers 131b and 132b may basically serve to protect the electrode layers 131a and 132a and/or improve mounting characteristics.

Figure 7:
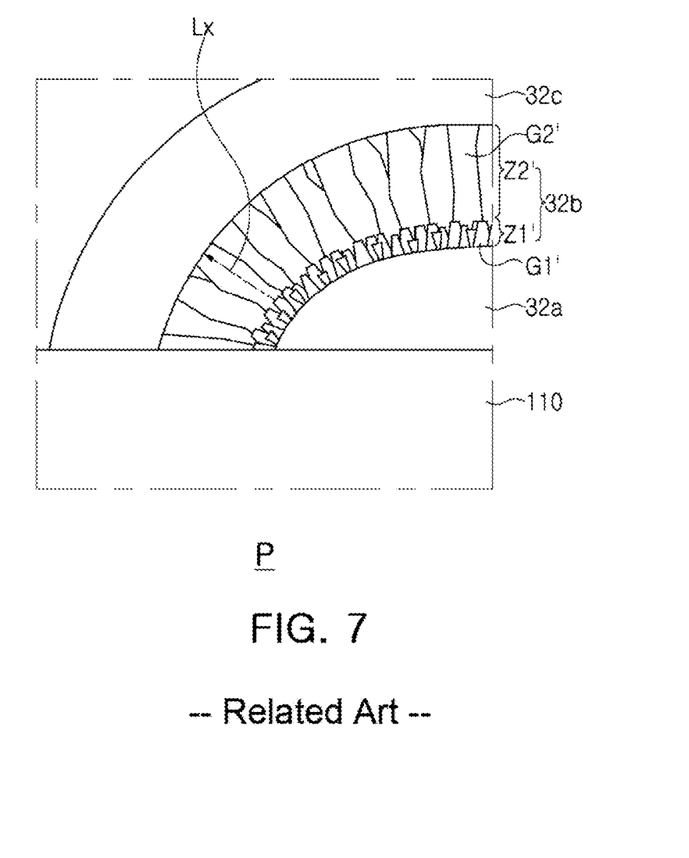
FIG. 7 schematically illustrates a plating layer at the end of a band portion of Comparative Example.
Figure 8:
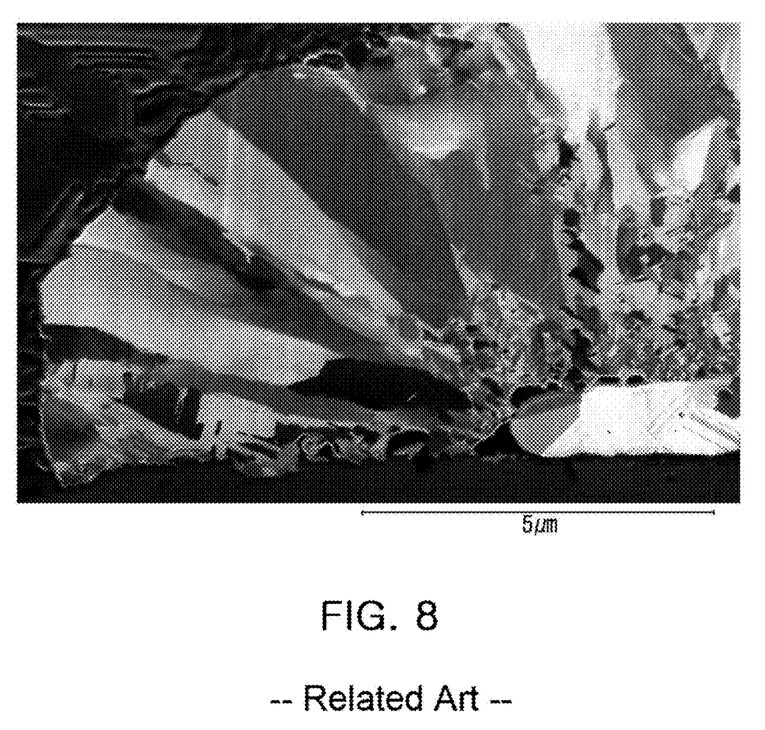
FIG. 8 is an image obtained by scanning a plating layer at the end of a band portion of Comparative Example with an scanning electron microscope (SEM)

Referring to FIGS. 7 and 8 for Comparative Example which is a plating layer structure of the related art, unlike the interface of the electrode layer 32a and the plating layer 32b, the interface between the body 110 and the plating layer 32b has a low bonding force, and thus, the interface between the body 110 and the plating layer 32b may be open by stress that occurs during plating or external force after plating. In addition, the open interface may become a path of moisture penetration to cause deterioration of moisture resistance reliability. Meanwhile, an additional plating layer 32c may be disposed on the plating layer 32b of the related art.

As a result of research conducted by the present inventors, it was found that the general plating layer 32b of the related art includes grains grown upon receiving charges from an electrode layer, so that a growth direction of grains of the plating layer at the end of the band portion was a horizontal direction, and thus, a bonding force with the body was low.

Referring to a microstructure of the plating layer 32b, fine grains G1' are formed in a first region Z1' adjacent to the electrode layer 32a, and grains G2' are grown to be large in the second region Z2' on the first region Z1'. At this time, a direction of the major axis Lx of the grain G2' may be considered as a growth direction of the grains. As can be seen from the growth direction of the grains, a plating tissue has a shape grown from the electrode layer 32a, and the grain of a portion in contact with the body 110 has a growth direction parallel to the surface of the body, so that, although the plating layer 32b is bonded to the body 110, it may be difficult for the plating layer 32b and the body 110 to have a strong bonding force therebetween.

Meanwhile, according to an exemplary embodiment in the present disclosure, when a grain in which an angle between the surface BS of the body in contact with the extension and the major axis Lx of the grain is 70 degrees or greater and 110 degrees or less is included in the extensions 131b2 and 132b2 of the plating layer, a bonding force between the body 110 and the plating layers 131b and 132b may be improved, and accordingly, the moisture resistance reliability of the multilayer electronic component may be improved.

Figure 6:
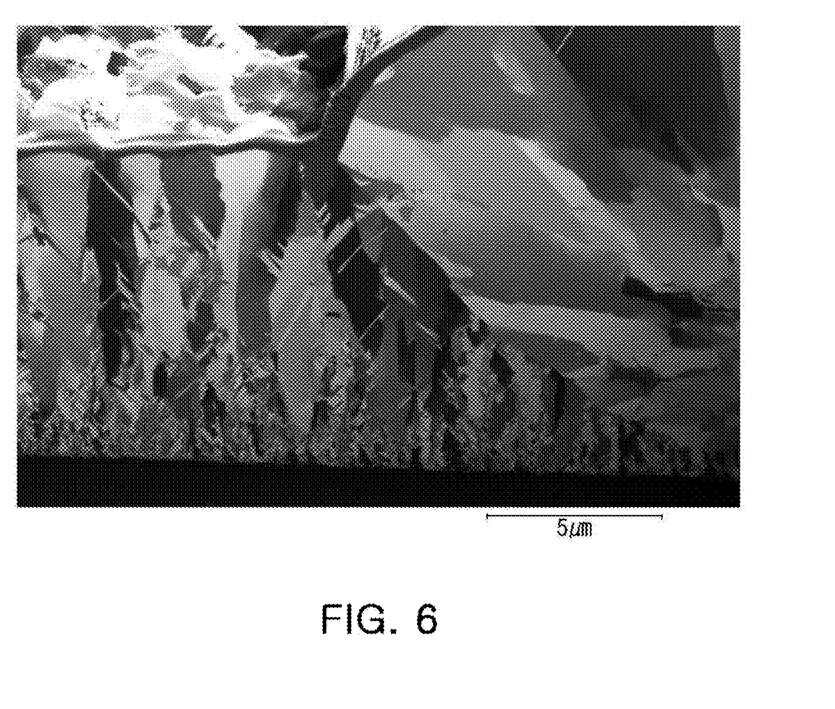
FIG. 6 is an image obtained by scanning a plating layer at the end of a band portion of Example with an scanning electron microscope (SEM)

In an exemplary embodiment, referring to FIGS. 5 and 6, the extensions 131b2 and 132b2 include a first region Z1 adjacent to the body and a second region Z2 disposed on the first region, and when a grain included in the first region is a first grain G1, a grain included in the second region is a second grain G2, and an angle between a major axis of the second grain and the surface of the body in contact with the extension is θ2, at least one of the second grains may satisfy that θ2 is 70 degrees or greater and 110 degrees or less.

When θ2 is 70 degrees or greater 110 degrees or less, the grain may be considered as a grain that has grown in a longitudinal direction, and when the extensions 131b2 and 132b2 do not include grains grown in the longitudinal direction, a bonding force between the extensions 131b2 and 132b2 and the body may be lowered and the extension may fall from the body interface.

More preferably, at least one of the second grains G2 may satisfy that θ2 is 80 degrees or more and 100 degrees or less. More preferably, an θ2 average value of the second grains may be 70 degrees or greater and 110 degrees or less.

Meanwhile, FIGS. 1 through 6 illustrate a structure in which the extensions 131b2 and 132b2 are disposed in the band portion of the external electrode, but the present disclosure is not limited thereto, and when the external electrode does not have a band portion, a portion in which the plating layer is in contact with the body may be considered as an extension.

Table 1 below is a result of measuring and evaluating moisture resistance reliability of Comparative Example having the plating layer structure of FIGS. 7 and 8 and Example having the plating layer structure of FIGS. 5 and 6.

Referring to FIGS. 7 and 8, In Comparative Example, it can be seen that the grains are grown in a transverse direction at an angle less than 70 degrees with respect to the surface of the body in contact with the extension, at the extension, which is a portion in which the plating layer is in contact with the body.

Meanwhile, referring to FIGS. 5 and 6, in Example, the extensions 131b2 and 132b2 of the plating layers include grains in which an angle between the surface BS of the body in contact with the extension and the major axis Lx of the grain is 70 degrees or greater and 110 degrees or less, confirming that the grains are grown in a longitudinal direction.

For the evaluation of moisture resistance reliability, 400 samples of each of Comparative Example and Examples were prepared, and after applying 1 VR (=rated voltage) of the evaluation model for 3 hours under the condition of 85° C. and humidity of 85%, a case in which insulation resistance was dropped to $10^7 \Omega$ or lower was determined as a defect and the number samples, which were defective, was described.

TABLE 1

| Classification | Evaluation of moisture resistance reliability | Defect rate of moisture resistance reliability |
| --- | --- | --- |
| Comparative Example | 8/400 | 2% |
| Example | 1/400 | 0.25% |

As can be found in Table 1, in the case of Comparative Example, there are 8 samples with poor moisture resistance reliability among 400 samples, whereas, in the case of Example, there is 1 sample with poor moisture resistance reliability among 400 samples, confirming that there is a significant difference in moisture resistance reliability depending on the shape of the gains of the extensions.

In an exemplary embodiment, in the extensions 131b2 and 132b2, a direction in which the grains are grown may be a direction substantially perpendicular to the surface (BS) of the body in contact with the extension.

Here, that the direction in which the grains are grown may be the direction substantially perpendicular to the surface (BS) of the body in contact with the extension may mean that the extensions 131b2 and 132b2 include grains in which the angle between the surface BS of the body in contact with the extensions 131b2 and 132b2 and the major axis Lx of the grain is 70 degrees or greater and 110 degrees or less.

A method for securing the structure of the extensions 131b2 and 132b2 described above is not particularly limited. For example, before the plating layers 131b and 132b are formed, a plating seed may be grown from the body through a surface treatment. At this time, the surface treatment may refer to an electrochemical reaction, an organic chemical reaction, etc., but is not limited thereto.

In an exemplary embodiment, the average value of the major axis length of the second grain G2 may be 1 μm or greater. If the average value of the major axis length of the second grain G2 is less than 1 μm, the grain growth is not sufficient and the effect of improving the bonding force between the extension and the body may be insufficient.

In an exemplary embodiment, the average value of the major axis Lx length of the second grain G2 may be three times or more the average value of a minor axis length. If the average value of the major axis Lx length of the second grain G2 is less than three times the average value of the minor axis length, grain growth is not sufficient and the effect of improving the bonding force between the extension and the body may be insufficient. Here, the minor axis of the second grain G2 may refer to a line orthogonal to the major axis Lx of the second grain G2 in the center of the major axis Lx of the second grain G2.

The method of measuring the major axis Lx of the second grain, the angle θ2 between the major axis of the second grain and the surface of the body in contact with the extension, the major and minor axes of any grain disclosed herein, and θ4 is not particularly limited. For example, they may be measured by performing scanning electron microscope (SEM) analysis in a cross-section in the first and second directions cut in the central portion of the multilayer electronic component 100 in the third direction. Other methods and/or tools appreciated by one of ordinary skill in the art, even if not described in the present disclosure, may also be used.

Figure 9A:
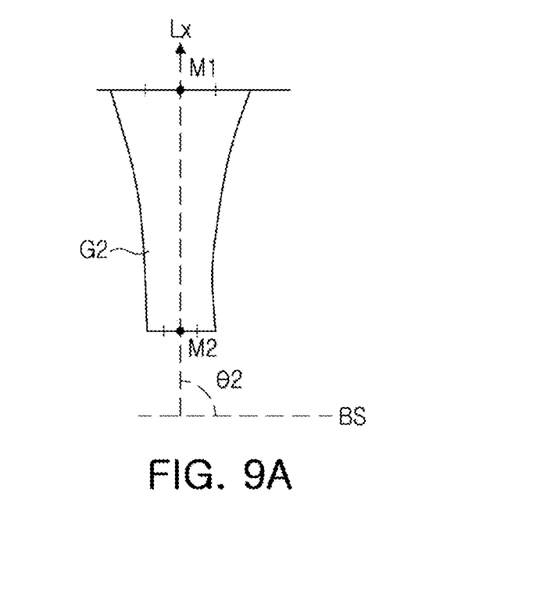
FIG. 9A schematically illustrates the major axis of the second grain G2 according to one embodiment of the disclosure.

Referring to FIG. 9A, the major axis of the second grain G2 may be a straight line connecting a middle point M1 of a segment farthest from the surface BS of the body in contact with the extension, among segments constituting a grain boundary of the second grain, and a middle point M2 of a segment most adjacent (nearest) to the surface BS of the body.

Figure 9B:
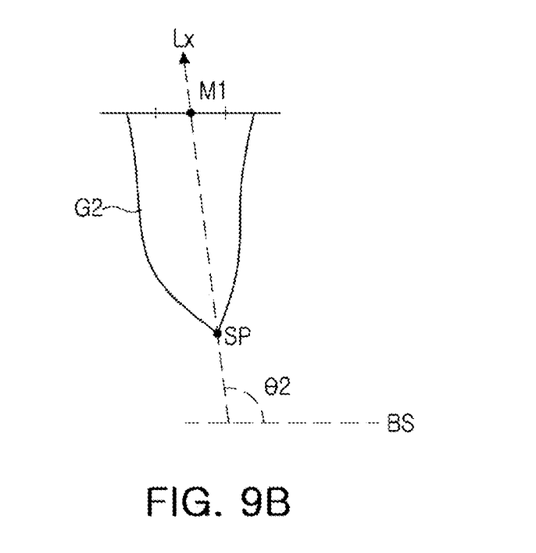
FIG. 9B schematically illustrates the major axis Lx of the second grain G2 according to another embodiment of the disclosure.

Meanwhile, referring to FIG. 9B, the second grain G2 may have a sharp point (tip) located at the lowest end according to the conditions of growth. In this case, the major axis Lx of the second grain G2 may refer to a straight line connecting the middle point M1 of the segment farthest from the surface BS of the body in contact with the extension and a sharp point SP (tip) most adjacent (nearest) thereto.

As described above, after determining the major axis Lx of the second grain G2, the angle θ2 with respect to the surface BS of the body may be measured.

The angle θ2 between the major axis of the second grain G2 and the surface of the body in contact with the extension and the average value of the major axis and the minor axis of the second grain G2 may refer to an average value of values obtained from measurement from five or more grains, among certain second grains G2.

Meanwhile, the sizes of the first grain G1, the second grain G2, the third grain G3, and the fourth grain G4 may be measured by performing SEM analysis in the cross-section in the first and second directions cut in the central portion of the multilayer electronic component 100 in the third direction.

The first grain G1 may act as a plating seed (SEED), and thus, the size of the grain may be small. Meanwhile, the second grain G2 is grown from the first grain G1 and has a size greater than that of the first grain G1.

In an exemplary embodiment, the average size of the second grain G2 may be twice or more of the average size of the first grain G1. In this case, the size of the first grain G1 may refer to the average value of the major axis length and the minor axis length of the first grain G1, and the size of the second grain G2 may refer to the average value of the major axis length and the minor axis length of the second grain G2.

The size of the first and second grains G1 and G2 may not be particularly limited. For example, the average size of the first grain may be 0.5 µm or less. In addition, the average size of the second grain may be 1 µm or greater.

In an exemplary embodiment, when the regions of the plating layers 131b and 132b disposed on the electrode layers 131a and 132a are electrode cover portions 131b1 and 132b1, the electrode cover portions 131b1 and 132b1 may include a third region Z3 adjacent to the electrode layer and a fourth region Z4 disposed on the third region, and when a grain included in the third region is the third grain G3, a grain included in the fourth region is the fourth grain G4, and an angle between the major axis of the fourth grain and the surface of the body in contact with the extension is θ4, at least one of the fourth grains may have θ4 of 60 degrees or less and 130 degrees or greater.

Since the grains of the electrode cover portions 131b1 and 132b1 are grown upon receiving charges from the electrode layers 131a and 132a during plating, the grain may be grown in a direction perpendicular to the surfaces of the electrode layers 131a and 132a. The third grain G3 may act as a plating seed, and thus, a size of the grain may be small. Meanwhile, the fourth grain G4 is grown from the third grain G3 and may have a size greater than that of the third grain G3.

In an exemplary embodiment, the average size of the fourth grain G4 may be twice or more of the average size of the third grain G3. In this case, the size of the third grain G3 may refer to the average value of the major axis length and the minor axis length of the third grain G3, and the size of the fourth grain G4 may refer to the average value of the major axis length and the minor axis length of the fourth grain G4.

The size of the third and fourth grains G3 and G4 may not be particularly limited. For example, the average size of the third grain may be 0.5 µm or less. In addition, the average size of the fourth grain may be more than 1 µm.

Meanwhile, since the end of the band portion of the electrode layers 131a and 132a gradually becomes thinner, θ4 may gradually decrease to 60 degrees or less and converge toward 0 degrees toward the end of the band portion, or may gradually increase to 130 degrees or greater and converge toward 180 degrees.

Thus, the fourth region Z4 may include the fourth grain G4 in which θ4 is 60 degrees or less and 130 degrees or greater in a region adjacent to the extensions 131b2 and 132b2.

In addition, referring to FIGS. 5 and 6, it can be seen that a growth direction of the grains is significantly changed based on the boundary between the extensions 131b2 and 132b2 and the electrode cover portions 131b1 and 132b1, and a difference between θ2 and θ4 may be the largest at the boundary between the extensions 131b2 and 132b2 and the electrode cover portions 131b1 and 132b1.

In an exemplary embodiment, in the electrode cover portions 131b1 and 132b1, a growth direction of grains may be substantially perpendicular to the surfaces of the electrode layers 131a and 132a in contact with the electrode cover portion.

In an exemplary embodiment, the plating layers 131b and 132b may include one or more of Cu, Ni, Pd, Cr, and alloys thereof. More preferably, the plating layers 131b and 132b may include one or more of Ni, Cu, and alloys thereof. This is because Ni, Cu, and alloys thereof may more easily protect the electrode layers 131a and 132a from an external environment. More preferably, the plating layers 131b and 132b may be Ni plating layers.

Meanwhile, in the plating layers 131b and 132b, the content of a metal element may be 95 at % or more. That is, the plating layers 131b and 132b may be substantially formed of metal.

In exemplary an embodiment, the external electrodes 131 and 132 may further include the additional plating layers 131c and 132c disposed on the plating layers 131b and 132b.

Additional plating layers 131c and 132c may basically improve the mounting characteristics.

The types of additional plating layers 131c and 132c are not particularly limited and may be selected according to a mounting method. For example, when the multilayer electronic component is mounted on a substrate using solder, the additional plating layers 131c and 132c may be preferably Sn plating layers. In addition, when the multilayer electronic component is mounted on the substrate using a conductive adhesive, the additional plating layers 131c and 132c may include Pd, Ag, and alloys thereof.

A multilayer electronic component 100 according to an exemplary embodiment in the present disclosure may include a body 110 including a dielectric layer 111 and internal electrodes 121 and 122; and external electrodes 131 and 132 including electrode layers 131a and 132a disposed on the body and plating layers 131b and 132b disposed on the electrode layers, wherein the plating layers 131b and 132b include extensions 131b2 and 132b2 extending onto the body to contact the body, and a growth direction of a grain of the extensions 131b2 and 132b2 is substantially perpendicular to a surface BS of the body in contact with the extensions.

Here, that the direction in which the grains are grown may be the direction substantially perpendicular to the surface (BS) of the body in contact with the extension may mean that the extensions 131b2 and 132b2 include grains in which the angle between the surface BS of the body in contact with the extensions 131b2 and 132b2 and the major axis Lx of the grain is 70 degrees or greater and 110 degrees or less.

In an exemplary embodiment, a growth direction of the grains of the electrode cover portions 131b1 and 132b1 may be substantially perpendicular to the surfaces of the electrode layers 131a and 132a in contact with the electrode cover portions.

One of the various effects of the present disclosure is to improve a bonding force between the body and the plating layer as the extension of the plating layer includes one or more grains in which an angle between the surface of the body and the major axis of the grain is 70 degrees or greater and 110 degrees or less.

One of the various effects of the present disclosure is to suppress penetration of moisture and the like into the body by preventing opening of the interface between the body and the plating layer.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and internal electrodes; and
external electrodes including an electrode layer disposed on the body and a plating layer disposed on the electrode layer,
wherein the plating layer includes extension extending onto the body to contact the body, and
the extension includes one or more grains in which an angle between a surface of the body in contact with the extension and a major axis of the one or more grains is 70 degrees or greater and 110 degrees or less.

2. The multilayer electronic component of claim 1, wherein
the extension includes a first region adjacent to the body and a second region disposed on the first region, and the first region includes a first grain, the second region includes a second grain, and an angle between a major axis of the second grain and the surface of the body in contact with the extension is $\theta 2$, the second grain satisfies: $\theta 2$ is 70 degrees or greater and 110 degrees or less.

3. The multilayer electronic component of claim 2, wherein the second grain satisfies: $\theta 2$ is 80 degrees or greater and 100 degrees or less.

4. The multilayer electronic component of claim 2, wherein an average $\theta 2$ value is 70 degrees or greater and 110 degrees or less.

5. The multilayer electronic component of claim 2, wherein an average value of a major axis length of the second grain is 1 μm or greater.

6. The multilayer electronic component of claim 2, wherein an average value of a major axis length of the second grain is 3 times greater than an average value of a minor axis length.

7. The multilayer electronic component of claim 2, wherein the major axis of the second grain is:
a straight line connecting a middle point of a segment most distant from the surface of the body in contact with the extension and a middle point of a segment nearest to the surface of the body in contact with the extension, or
a straight line connecting the middle point of a segment most distant from the surface of the body in contact with the extension and a tip nearest to the surface of the body.

8. The multilayer electronic component of claim 2, wherein an average size of the second grain is twice or more of an average size of the first grain.

9. The multilayer electronic component of claim 2, wherein an average size of the first grain is 0.5 μm or less.

10. The multilayer electronic component of claim 2, wherein an average size of the second grain is 1 μm or greater.

11. The multilayer electronic component of claim 2, wherein
a region of the plating layer disposed on the electrode layer is an electrode cover portion, the electrode cover portion includes a third region adjacent to the electrode layer and a fourth region disposed on the third region, and
the third region includes a third grain, the fourth region includes a fourth grain, and an angle between a major axis of the fourth grain and the surface of the body in contact with the extension is $\theta 4$, the fourth grain satisfies: $\theta 4$ is less than 60 degrees or 130 degrees or greater.

12. The multilayer electronic component of claim 11, wherein the fourth region includes a region adjacent to the extension and the region includes the fourth grain that satisfies: $\theta 4$ is 60 degrees or less or 130 degrees or greater.

13. The multilayer electronic component of claim 11, wherein an average size of the fourth grain is twice or more of an average size of the third grain.

14. The multilayer electronic component of claim 1, wherein the plating layer includes one or more of Cu, Ni, Pd, Cr, and alloys thereof.

15. The multilayer electronic component of claim 1, wherein the external electrode further includes an additional plating layer disposed on the plating layer.

16. The multilayer electronic component of claim 15, wherein the plating layer is Ni plating, and the additional plating layer is Sn plating layer.

17. A multilayer electronic component comprising:
a body including a dielectric layer and internal electrodes; and
external electrodes including an electrode layer disposed on the body and a plating layer disposed on the electrode layer,
wherein the plating layer includes an extension extending onto the body to contact the body, and
the extension includes a grain having a growth direction that is substantially perpendicular to a surface of the body in contact with the extension.

18. The multilayer electronic component of claim 17, wherein a region of the plating layer disposed on the electrode layer is an electrode cover portion, the electrode cover includes a grain having a growth direction that is substantially perpendicular to a surface of the electrode layer in contact with the electrode cover portion.

19. A multilayer electronic component comprising:
a body including a dielectric layer and internal electrodes; and
external electrodes including an electrode layer disposed on the body and a plating layer disposed on the electrode layer,
wherein the plating layer includes an extension extending onto the body to contact the body, and
the extension includes one or more grains in which an angle between a surface of the body in contact with the extension and a major axis of the one or more grains is 80 degrees or greater and 100 degrees or less.

20. The multilayer electronic component of claim 19, wherein the plating layer includes Ni.

21. The multilayer electronic component of claim 20, wherein the external electrode further includes an additional plating layer disposed on the plating layer.

22. The multilayer electronic component of claim 21, wherein the additional plating layer include Sn.

23. The multilayer electronic component of claim 19, wherein the extension includes a first region adjacent to the body and a second region disposed on the first region,
the first region includes a first grain, the second region includes a second grain, and an angle between a major axis of the second grain and the surface of the body in contact with the extension is 70 degrees or greater and 110 degrees or less, and
an average size of the second grain is twice or more of an average size of the first grain.

24. The multilayer electronic component of claim 23, wherein the plating layer includes an electrode cover portion disposed on the electrode layer, the electrode cover portion includes a third region adjacent to the electrode layer and a fourth region disposed on the third region, and
the third region includes a third grain, the fourth region includes a fourth grain, and an angle between a major axis of the fourth grain and the surface of the body in contact with the extension is θ4, the fourth grain satisfies: θ4 is less than 60 degrees or 130 degrees or greater.

25. The multilayer electronic component of claim 24, wherein the fourth region includes a region adjacent to the extension and the region includes the fourth grain that satisfies: θ4 is 60 degrees or less or 130 degrees or greater.

* * * * *